United States Patent [19]

Wagner et al.

[11] Patent Number: 4,676,111
[45] Date of Patent: Jun. 30, 1987

[54] METHOD AND APPARATUS FOR SOUND TESTING MUFFLERS

[75] Inventors: Wayne M. Wagner; Timothy A. Bethke, both of Apple Valley, Minn.

[73] Assignee: Donaldson Company, Inc., Minneapolis, Minn.

[21] Appl. No.: 818,038

[22] Filed: Jan. 13, 1986

[51] Int. Cl.⁴ .......................................... G01M 15/00
[52] U.S. Cl. .................................... 73/865.6; 73/117; 73/646
[58] Field of Search ...................... 73/865.6, 117, 646, 73/117.1, 116; 181/0.5

[56] References Cited

U.S. PATENT DOCUMENTS 1,044,121 11/1912 Beall .
1,830,237 11/1931 Morse .
3,127,767 4/1964 Kamp .
3,326,036 6/1967 Hoeppner .
3,695,098 10/1972 Kirkland, Jr. ..................... 73/117.1

FOREIGN PATENT DOCUMENTS 309270 7/1971 U.S.S.R. ............................... 73/116

OTHER PUBLICATIONS

Article: "Progress in the Reduction of Diesel Engine Noise" Robert L. Mason; *Sound and Vibration*, Feb. 1974; pp. 16-19.
SAE 840347: "A Transient Diesel Test Bed with Direct Digital Control"; J. Koustas and N. Watson; Internat'l Congress & Expo, Detroit, Michigan; Feb. 27-Mar. 2, 1984.
SAE 840348: "Transient Testing of Diesel Engines"; C. A. Clark, M. P. May & B. J. Challen; Internat'l. Congress & Expo, Detroit, Michigan, Feb. 27-Mar. 2, 1984.
SAE 840349: "Dynamometer Simulation of Truck and Bus Road Horsepower for Transient Emissions Evaluations"; Chas. M. Urban (Southwest Research Institute, San Antonio, Texas); pp. 69-84.
Brochure: "PAISI* Does It"; by BBC Brown Boveri (one page).
Brochure: "TELMA"; multi-page brochure.

*Primary Examiner*—Jerry W. Myracle
*Attorney, Agent, or Firm*—Merchant, Gould, Smith, Edell, Welter & Schmidt

[57] ABSTRACT

The present invention is directed to providing an inexpensive, yet effective, simulation for measuring the sound level of the muffler contribution to the total sound created by a truck during a drive-by. The simulation method includes disconnecting a drive shaft of the drive mechanism of the truck and installing a dynamometer. When the throttle of the engine is increased, the dynamometer applies a load so that the acceleration rate of the drive mechanism compares similarly to the acceleration rates of a truck during an actual drive-by test in accordance with CFR 40, part 202. Sound barriers are placed around sounds sources other than the muffler of the truck. Microphones are used to sense the sound during the test for recording by strip-chart recorders.

4 Claims, 11 Drawing Figures

U.S. Patent    Jun. 30, 1987    Sheet 1 of 8    4,676,111
FIG. 1
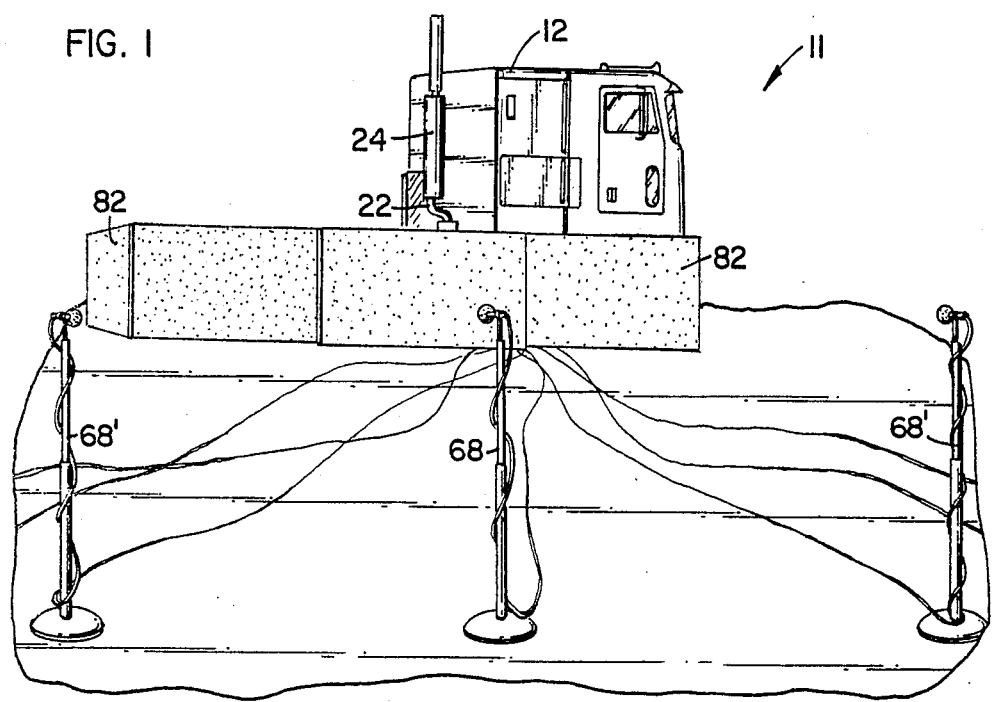
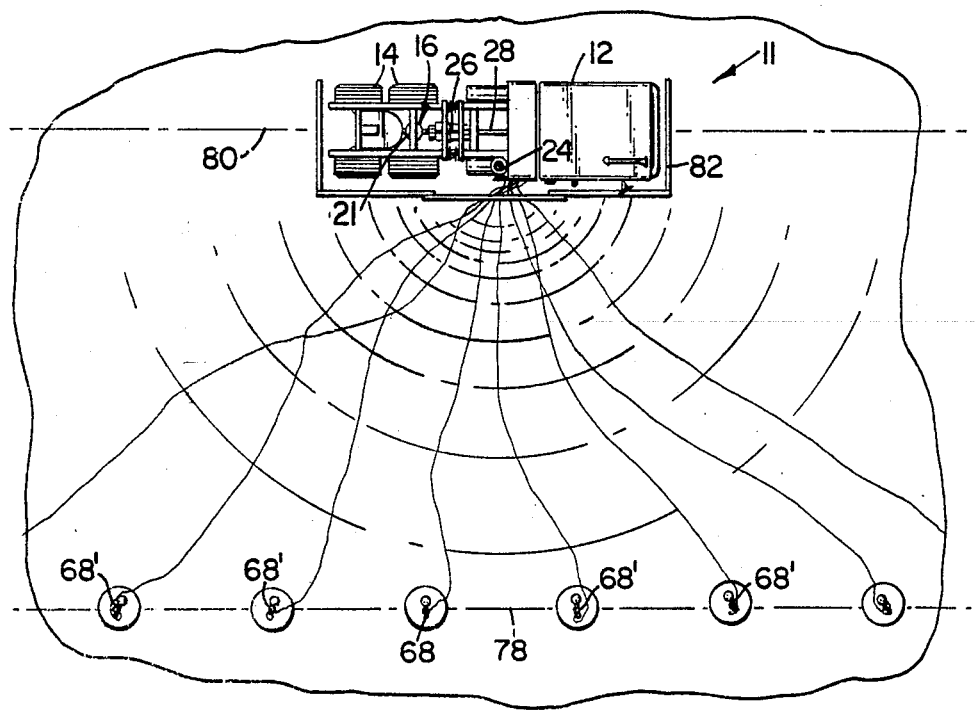
FIG. 2

METHOD AND APPARATUS FOR SOUND TESTING MUFFLERS

FIELD OF THE INVENTION

The present invention is directed to sound level measuring apparatus and, more specifically, to measuring the sound contribution of a muffler with respect to the total sound level of a vehicle during a simulated drive-by of the vehicle.

BACKGROUND OF THE INVENTION

United States federal legislation on trucks requires that sound level meter readings be taken during a transient "drive-by" test (CFR40, Part 202). The test condition requires driving a vehicle past a microphone and accelerating from two-thirds of maximum rpm to maximum rpm at full throttle. This test condition results in primarily an inertial loading (F=MA, where F=force=torque produced by engine multiplied by gear ratio, M=mass of truck, and A=acceleration of truck) of the engine. Frictional loading and vehicle drag are minimal because the test specifies a maximum vehicle speed of 35 miles per hour. The speed limitation also minimizes noises produced by the tires on the road surface.

Since the early 1970's in order to do research on mufflers to minimize the noise contribution due to the exhaust, sound testing has been commonly done with a dynamo-meter loaded engine. A prime requirement has been to isolate all engine and/or vehicle noise to a level well below the exhaust noise from the muffler to obtain sufficiently sensitive data.

In 1972, for example, U.S. Pat. No. 3,695,098 disclosed an underground test cell and method of its use. To test a muffler in accordance with that disclosure, an engine connected to a dynamometer is operated in the underground test cell with exhaust gases being directed through the roof of the underground test cell to a muffler mounted on a truck on the roof of the underground test cell. In this way, all sound sources are isolated in the test cell so that the muffler is the significant sound source outside the cell and only the truck body affects the radiation pattern of the sound from the muffler.

Another method which has been used is to partially shield the engine of a truck with a soundproof barrier of lead and fiberglass. The lead and fiberglass is generally placed over the entire hood and draped down along the front and sides of the truck. The draped portion extends near the ground, but does not contact the ground. The fan is disconnected to eliminate its noise. The truck is driven according to the speed and acceleration requirements for the test (ref. CRF 40, Part 202). The problem with this method is that it requires significant care and maintenance. The engine cannot be run for very long periods since the fan is not used and overheating can occur. The lead and fiberglass is difficult to work with since the hood needs to be opened to service the motor and the movement of the truck can displace the material. In addition, this method does not provide for sufficient sound source isolation in order to accurately measure the sound level of mufflers.

SUMMARY OF THE INVENTION

The present invention is directed to a test for measuring sound emission from a muffler which relatively simply, yet effectively, simulates a drive-by test while avoiding much of the elaborate set up of known methods, such as the U.S. Pat. No. 3,695,098. The present invention is directed to apparatus which includes an operable vehicle having wheels and mechanism for driving the wheels. The driving mechanism includes an engine with an exhaust system. The exhaust system includes a muffler. The driving mechanism, however, is disconnected with respect to driving the wheels. Rather, a portable dynamometer is attached to the vehicle and connected to the driving mechanism and controlled to simulate operational loading of the engine. Sound measuring mechanism including a microphone spaced from the vehicle is used to obtain sound level. Shielding mechanism at least partially shields sound emanating from the driving mechanism, but leaves the muffler unshielded with respect to the microphone.

To use the apparatus, the driving mechanism is first disconnected from the driving wheels of the vehicle. The portable dynamometer is then mounted on the vehicle and connected to the driving mechanism. The microphone is located a distance from the vehicle at a location where a sound level measurement is desired, usually the location of maximum sound level during a typical drive-by. The drive mechanism is at least partially shielded from the microphone to minimize sound from sources other than the muffler. The driving mechanism is run under the load of the dynamometer, and the sound level is measured at the microphone. In another embodiment, the throttle of the driving mechanism and the load applied by the dynamometer to the driving mechanism are appropriately varied to simulate an actual acceleration rate of the particular truck during an actual drive-by.

It is clear that the apparatus and method of the invention is much less elaborate than the apparatus and method of U.S. Pat. No. 3,695,098. With respect to the actual drive by method wherein sound sources are isolated except for the muffler, the present invention is also a significant improvement as demonstrated by the following example. A baseline sound level for a truck driving by may be obtained by isolating the various sound sources in the drive mechanism as discussed hereinbefore and by using several mufflers in combination in the exhaust system in order to drastically minimize the exhaust system sound level. Similarly, a baseline drive by simulation sound level may be obtained by preparing apparatus in accordance with the invention as discussed above, while also using a number of mufflers in combination to drastically minimize exhaust system sound level. Typical baseline values are as follows:

Baseline actual drive by level: 72.6 dB(A)
Baseline simulation drive by level: 65.9 dB(A).

Now by measuring a series of total truck drive-by sound levels and subtracting the baseline sound level, the contribution due to the muffler may be obtained. Take, for example, a series of drive by levels ranging from 73.9 to 74.9 dB(A) and subtracting the baseline sound level using the following equation:

$$dB_{1-2} = 10 \log_{10}\left[10^{(\frac{db1}{10})} - 10^{(\frac{db2}{10})}\right]$$

The following table results:

| Total Truck Drive-by Measured Level | Baseline Truck Drive-by Level − Without Exhaust | Muffler Exhaust Contribution = Level |
|---|---|---|
| 74.9 dB(A) | − 72.6 dB(A) | = 71 dB |

| Total Truck Drive-by Measured Level | | Baseline Truck Drive-by Level Without Exhaust | | Muffler Exhaust Contribution Level |
|---|---|---|---|---|
| 74.5 | − | 72.6 | = | 70 |
| 74.2 | − | 72.6 | = | 69 |
| 73.9 | − | 72.6 | = | 68 |

Hence, in order to differentiate between a muffler with an exhaust contribution of 68 dB, and a muffler with an exhaust contribution of 71 dB, the measured drive by sound levels vary by only one dB. The problem is that one dB is most likely within the experimental error of truck drive-by testing equipment and truck operating variables.

With the present invention, on the other hand, the same 3 dB difference in the contribution of various assumed mufflers results from drive by simulation sound levels which differ by 2.1 dB as shown in the following table:

| Total Truck Drive-by Simulation Level | | Baseline Drive-by Simulation Level | | Muffler Exhaust Contribution Level |
|---|---|---|---|---|
| 72.2 dB(A) | − | 65.9 dB(A) | = | 71 dB |
| 71.4 | − | 65.9 | = | 70 |
| 70.7 | − | 65.9 | = | 69 |
| 70.1 | − | 65.9 | = | 68 |

Thus, the quieter the baseline sound level and the larger the spread of the total sound level measured, the more confident one can be that the differentiation between different mufflers is accurate. Therein, therefore, lies a peculiar advantage of the present invention.

BRIEF DESCRIPTION OF THE DRAWINGS

FIG. 1 is an illustration in perspective of test apparatus in accordance with the present invention;

FIG. 2 is a top view of the test apparatus of FIG. 1;

FIG. 8 is a graphic illustration of acceleration in revolutions per minutes versus time for an actual truck drive by;

DETAILED DESCRIPTION OF THE PREFERRED EMBODIMENT

Figure 3:
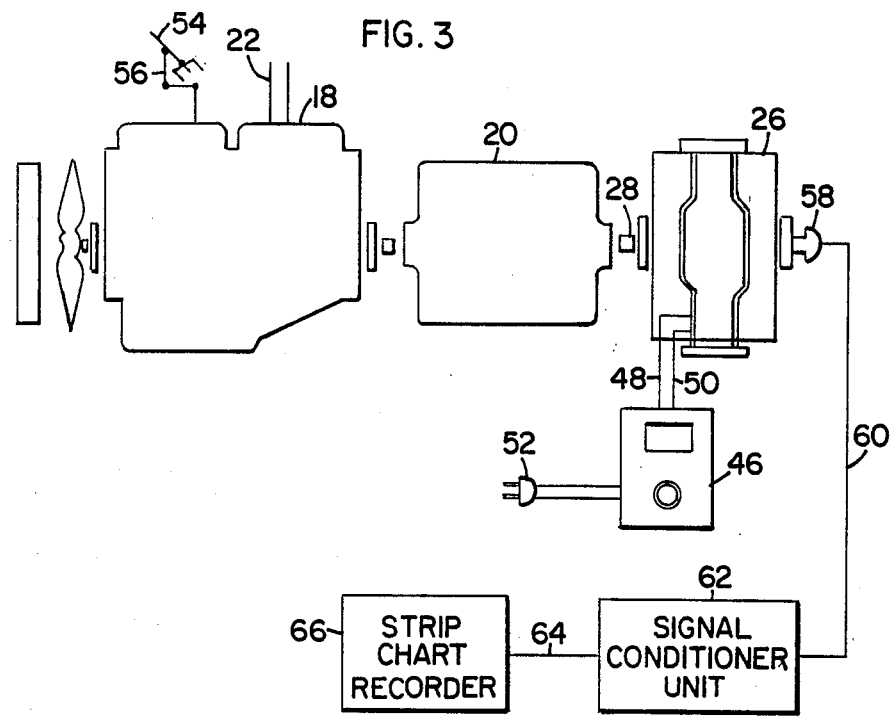
FIG. 3 is an illustration of the driving mechanism and controls, and a block diagram showing recording electronics to measure the acceleration rate for the driving mechanism.

Referring now to the drawings wherein like reference numerals designate identical parts throughout the several views, and more particularly to FIGS. 1 and 2, apparatus in accordance with the present invention is designated generally by the numeral 11. Apparatus 11 includes a vehicle 12, ordinarily a truck, having wheels 14 and a drive mechanism 16 for driving wheels 14. Thus, before preparation for the test of the present invention, vehicle 12 is an operable vehicle. As further illustrated in FIG. 3, the driving mechanism includes an engine 18 operably connected to a gear box 20 which is ordinarily connected by a drive shaft to a differential 21 (see FIG. 2). Exhaust gases from the engine 18 are directed through piping assembly 22 to a muffler 24.

Figure 5:
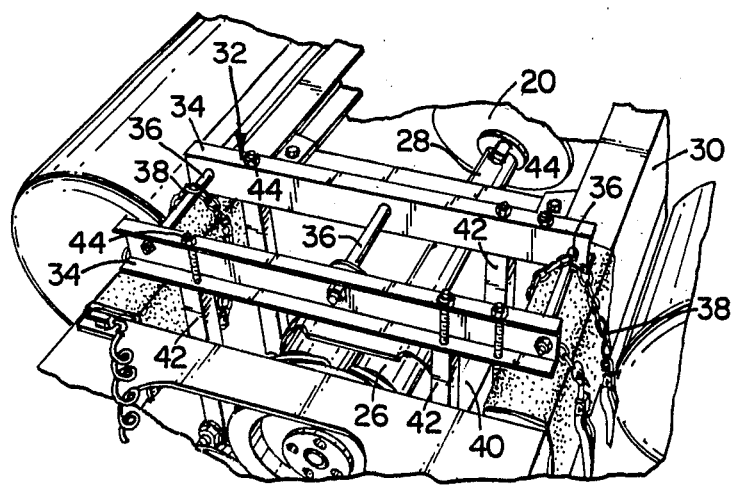
FIGS. 5 and 6 are perspective views of the attachment of the dynamometer to the truck frame and to the driving mechanism of the truck in accordance with the present invention.
Figure 6:
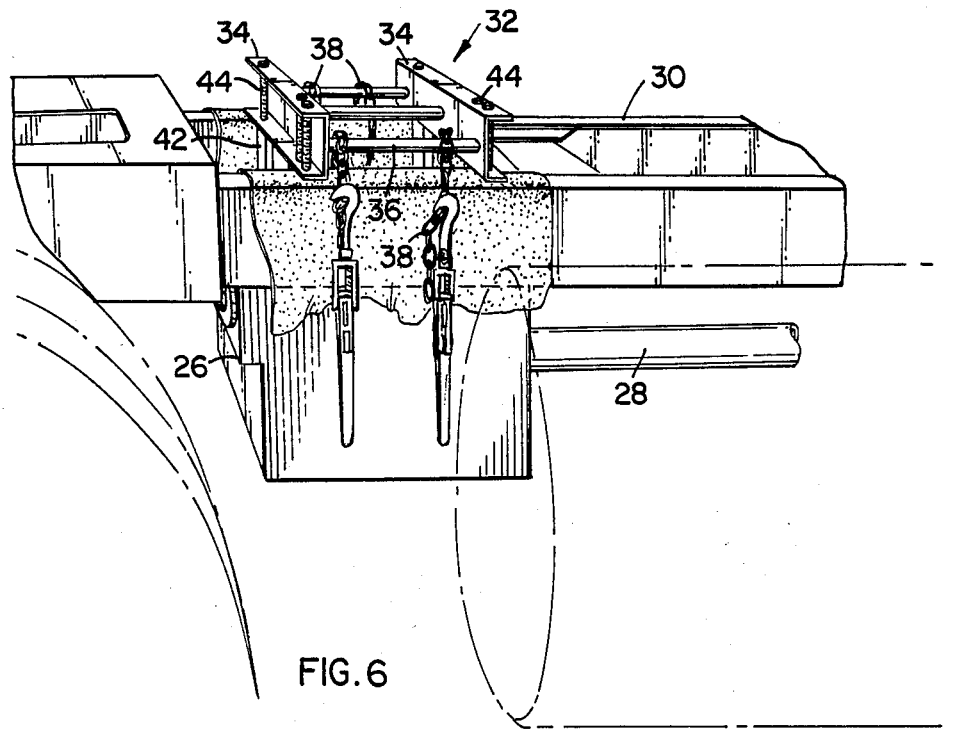

For the test of the present invention, the driving mechanism 16 is disconnected between gear box 20 and differential 21 to provide for installation of dynamometer 26. As shown in FIG. 5, a shaft 28 is operably attached between dynamometer 26 and gear box 20. Dynamometer 26 is attached to the frame 30 of truck 12 with assembly 32. Assembly 32 includes a pair of channel members 34 spaced apart by a plurality of rods 36. Chains 38 attached at the top to the outer rod 36 on either side of assembly 32 hold assembly 32 to frame 30. Vertical posts 42 are fastened between channel members 34 and a platform 40 which holds dynamometer 26. Posts 42 are bolted at nut-and-bolt combinations 44 to channel members 34, for alignment purposes.

A number of dynamometers are known. For example, common types include water, eddy current, hydrostatic and direct current machines. As indicated hereinbefore, dynamometer 26 must provide an inertial loading to simulate the test condition of CFR 40 PART 202. An eddy current machine is able to provide the necessary loading. Dynamometer 26 is controlled by controller 46 through electrical wires 48 and 50. Controller 46 is an appropriate type for the particular dynamometer 26 and is energized with usual AC power as illustrated at plug 52.

To control engine 18, the usual throttle mechanism of truck 12 may be used. The throttle mechanism is illustrated in FIG. 3 to include linkage 56 attached between control lever 54 and engine 18 in the usual manner.

Figure 4:
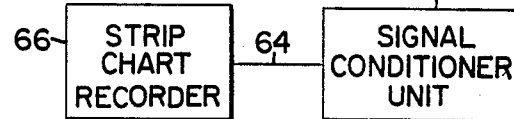
FIG. 4 is a block diagram illustration of the recording electronics for measuring the sound.

As further shown in FIG. 3, drive mechanism speed in revolutions per minute may be measured with tachometer 58 at the unattached end of dynamometer 26 and, as schematically shown, communicated via line 60 to a signal conditioner unit 62 which controls via line 64 strip chart recorder 66. In a similar fashion, sound sensed at a microphone 68 is illustrated in FIG. 4 to be communicated via line 70 to a signal conditioner unit 72 for controlling via line 74 strip chart recorder 76. A microphone 68 is preferably located in a position with respect to nonmoving truck 12 where maximum sound level from muffler 24 is expected. As shown in FIGS. 1 and 2, other microphones 68' may be regularly spaced in either direction from microphone 68 along a line 78 which is preferably parallel with an imaginary direction of travel line 80 of truck 12. The microphones which are generally forwardly of vehicle 12 provide simulated information with respect to the approaching sound level of a truck 12 having a muffler 24, while the microphones 68' generally rearwardly provide simulated sound level information with respect to a departing truck 12 with muffler 24.

As shown in FIGS. 1 and 2, shield members 82 are placed in front, in back, and along the side of truck 12 facing microphone 68 and extend from the ground to at least the body of truck 12. Shield members 82 are made from a solid absorptive material such as fiberglass, which effectively absorbs and reflects sound. The purpose is to shield sound from the engine and other driving mechanism sources from microphone 68 and the other microphones 68' so that the truck background sound level for muffler testing 24 is as low as possible. Additional shield members may be placed in other locations around sound sources so as to further isolate them. This may be advantageously done since with the present apparatus truck 12 does not move. It is noted that muffler 24 is positioned in its usual operational location with respect to the body of truck 2. In this way, Muffler 24 is the predominant sound source and its sound pattern is influenced by the body of truck 12 in the same way that it will be so influenced when truck 12 is otherwise operated.

In use, a truck 12 is positioned at a location where other sound sources are at a minimum and where buildings, trees and other reflective sources are at a minimum. The driving mechanism of the truck is disconnected between gear box 20 and differential 21. A dynamometer 26 is connected to gear box 20 and is mounted to truck 12, preferably at frame 30. At least one microphone 68 is located a distance from vehicle 12 where a sound level measurement is desired. The other sound sources from the driving mechanism of truck 12 are at least partially shielded so that muffler 24 is the predominant sound source with respect to microphone 68. The driving mechanism is then operated under the load of dynamometer 26. The method of use of apparatus 11 preferably further includes the step of determining a desired acceleration rate to be simulated by engine 18 as loaded by dynamometer 26 and then simulating said acceleration rate by controlling throttle lever 54 and dynamometer controls 46. Also, a plurality of microphones 68' may be used in addition to microphone 68 to provide sound level measurements at a variety of locations.

Figure 7:
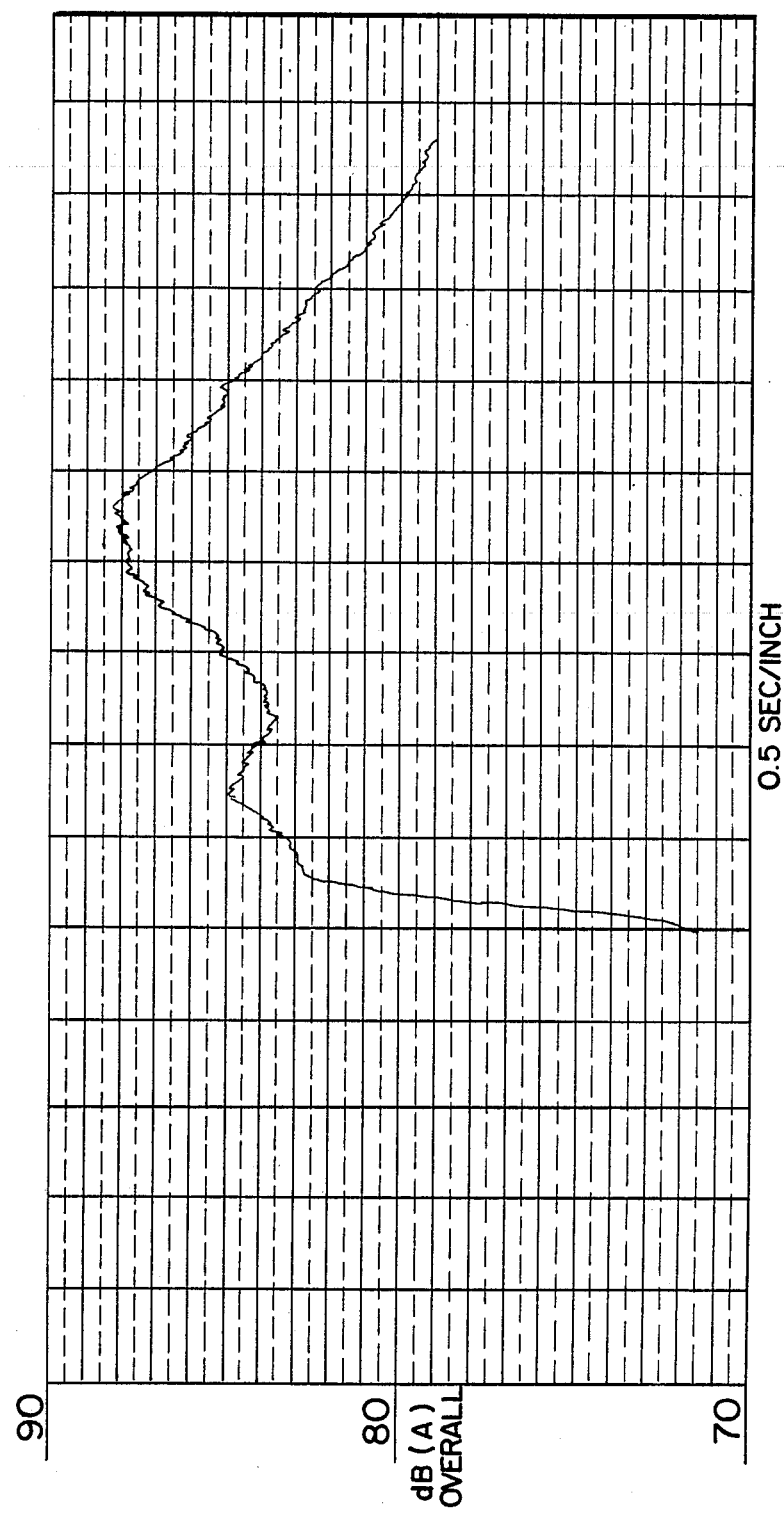
FIG. 7 is a graphic illustration of sound level versus time for an actual truck drive-by without a muffler.

The applicability and the peculiar advantage of the test apparatus and method of the present invention is more clearly understandable on consideration of the results of its use as shown in the typical graphs shown in FIGS. 7-11. FIG. 7 shows a sound level graph of sound measured as a truck with its muffler off (replaced with a straight pipe) drove by a microphone. The truck had the hood covered with a lead and fiberglass sound absorptive material, with additional sound absorptive material extending within several inches of the ground along the front and the side facing the microphone as discussed hereinbefore. The microphone was 50 feet from the centerline of the truck as it passed by. Ambient noise level was 60 dB(A). In particular, it is seen that the graph exhibits a double hump with the second hump or maximum being greater than the first; this data, since it is totally exhaust noise, is used for correlation to a stationary test (FIG. 9) in accordance with the invention.

Figure 8:
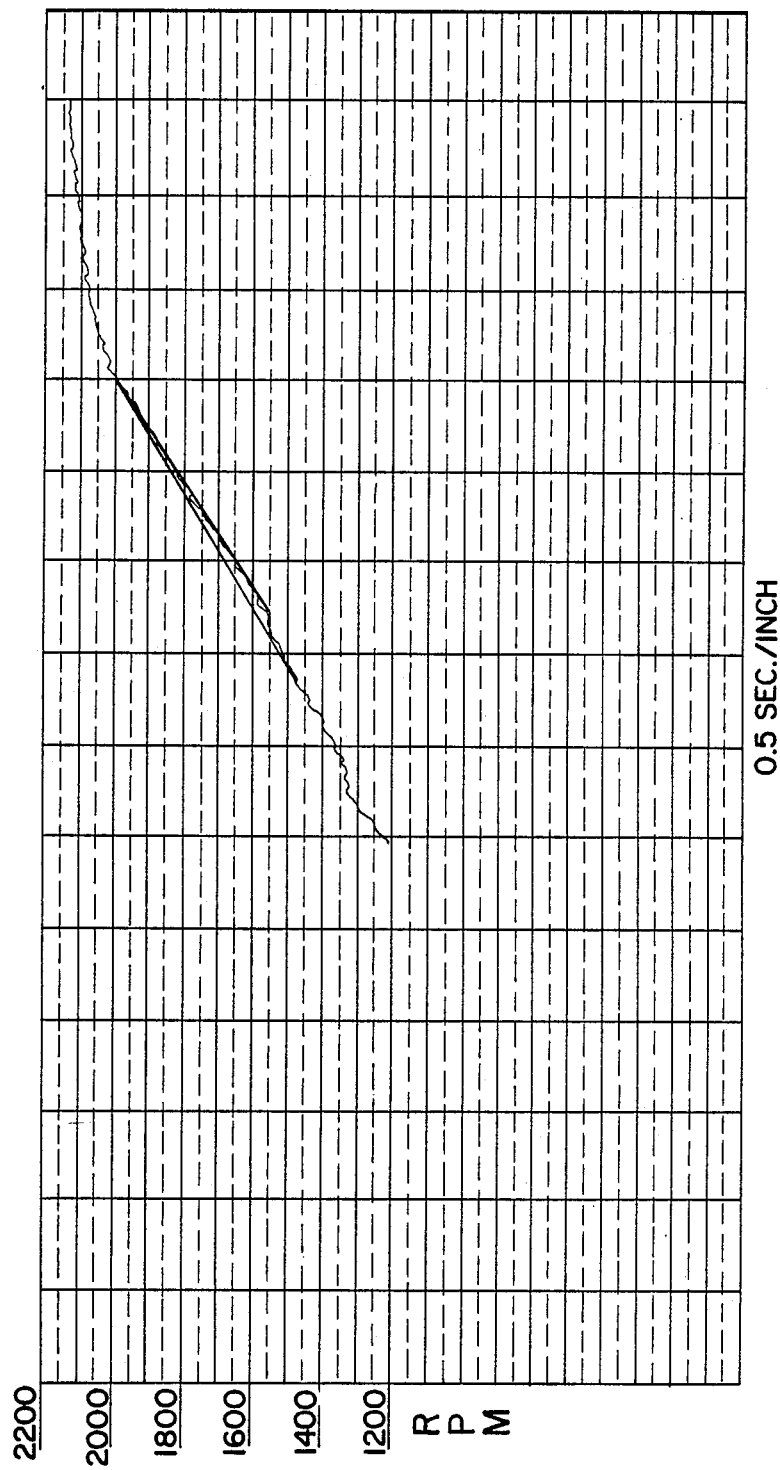

FIG. 8 shows an acceleration curve for the drive by described with respect to FIG. 7. As mentioned previously, the truck approaches the microphone at two-thirds of maximum rpm and then accelerates to maximum rpm at full throttle such that total vehicle speed does not exceed 35 miles per hour. As shown in FIG. 8, the acceleration rate for the indicated test was linear in the range of 300 to 350 rpm per second (see straight lines).

Hence, in order to simulate the drive-by as described with respect to FIG. 7, it is necessary to simulate the acceleration rate of FIG. 8 and then to measure sound. The sound curve must be similar to FIG. 7 if there is to be confidence in the simulation.

Figure 9:
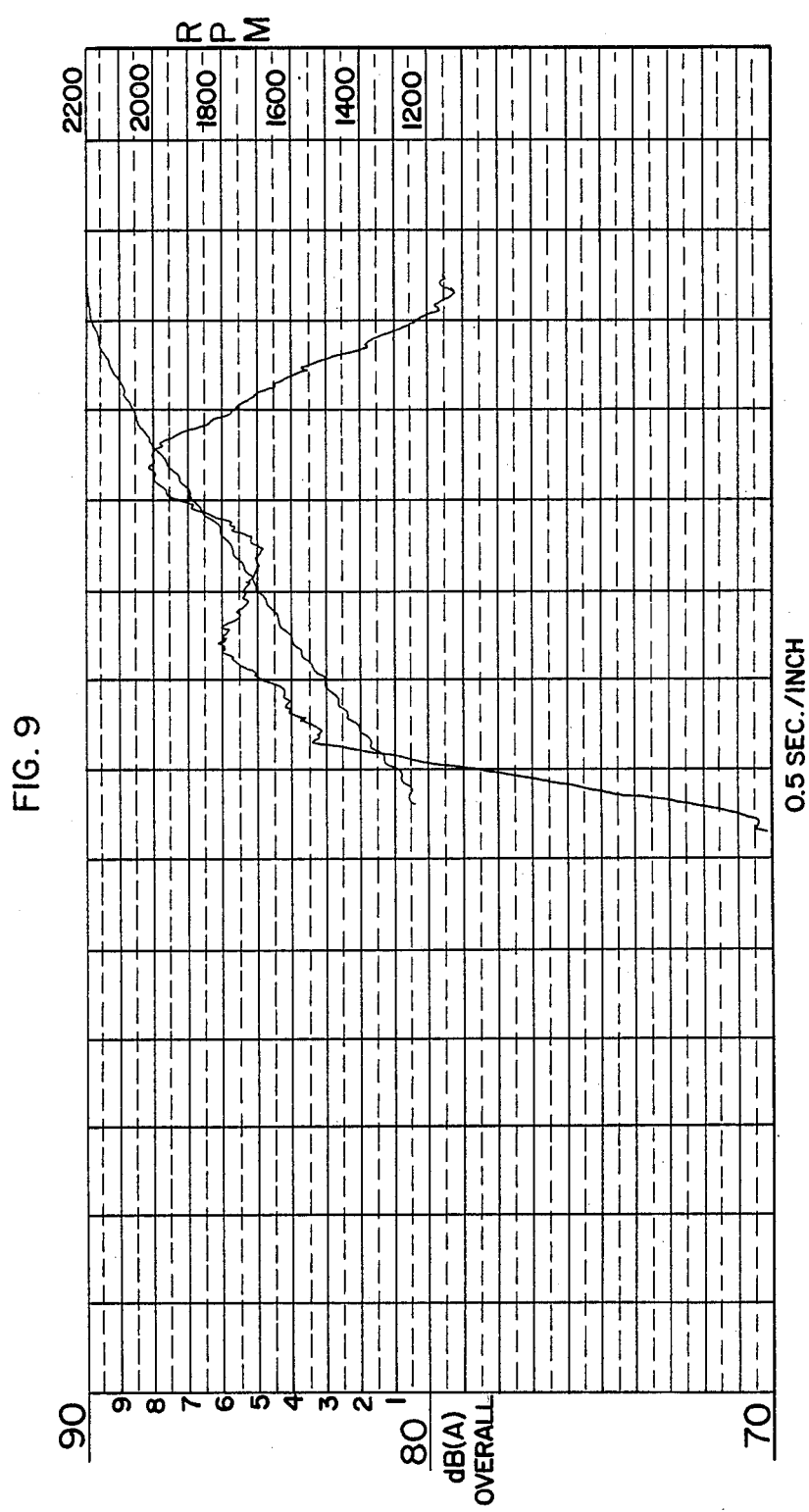
FIG. 9 is a graphic illustration of both sound level versus time and acceleration versus time for a simulated drive-by without a muffler.

FIG. 9 shows an acceleration rate curve and a sound level measuring using the method and apparatus of the present invention.

Note the linear acceleration rate in the range of 350 rpm per second, and note also the double-hump sound level curve. When the acceleration rate curve is linear at a rate approximately the same as that measured for an actual drive-by, the resulting sound level curve as evidenced by the curve shown in FIG. 9 is substantially similar to the actual drive-by sound level curve as shown in FIG. 7.

Figure 10:
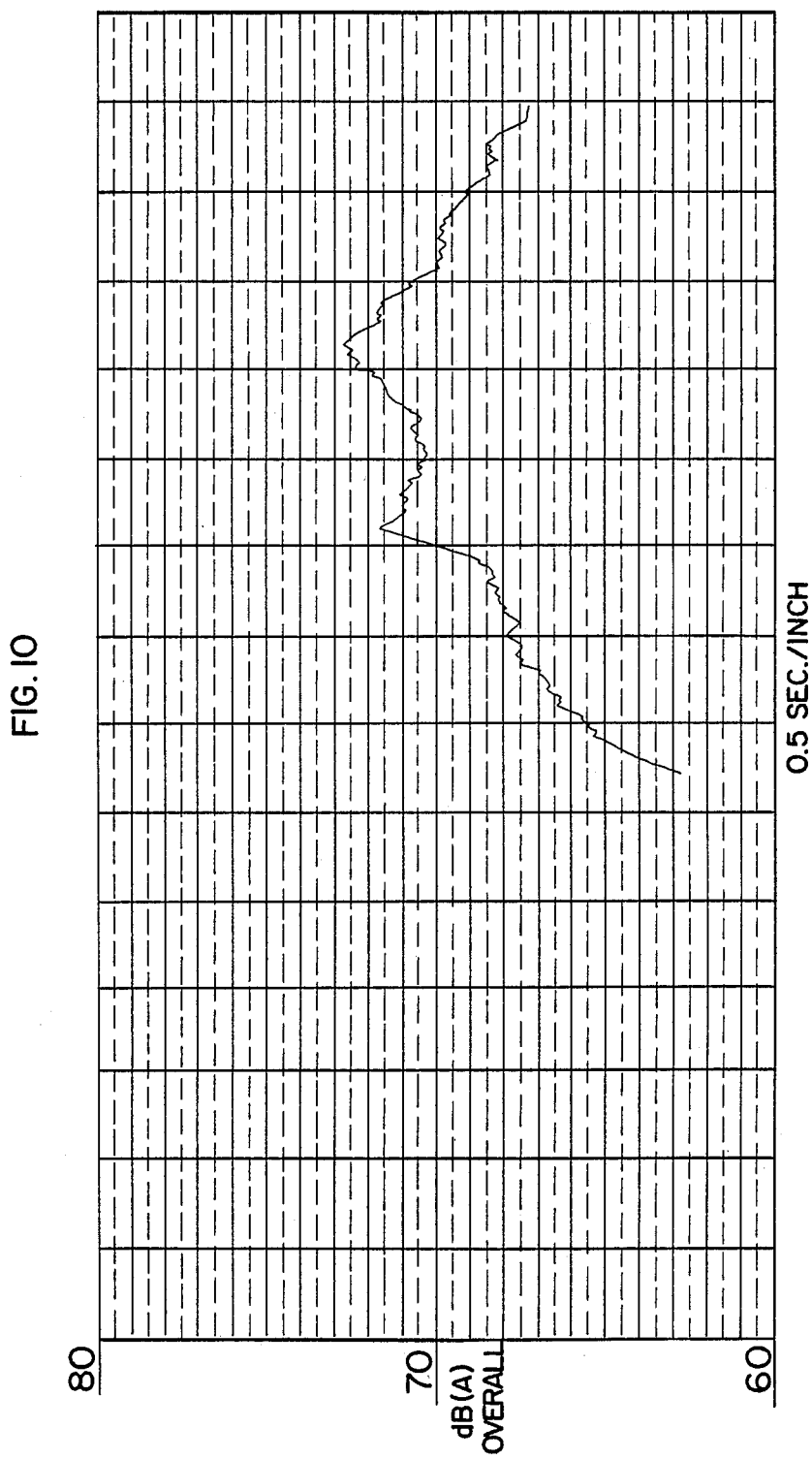
FIG. 10 is a graphic illustration of baseline sound level versus time of an actual drive by of a quiet truck.
Figure 11:
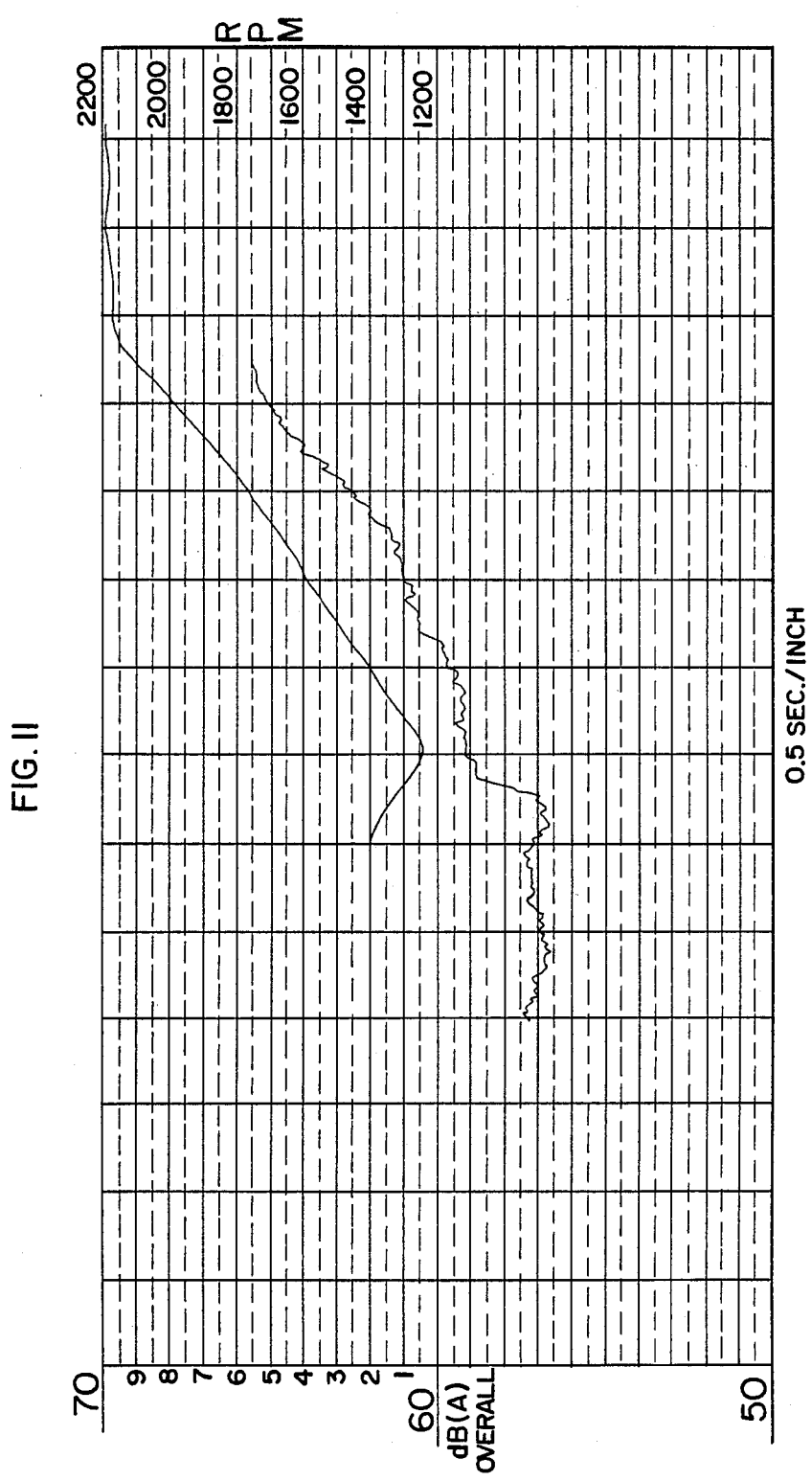
FIG. 11 is a graphic illustration of both sound level versus time and acceleration versus time for a simulated drive-by of a quiet truck.

Typical baseline sound level curves for an actual drive-by and for a simulation of a drive-by are shown in FIGS. 10 and 11, respectively. The curves are obtained in the same fashion as the sound level curves of FIG. 7 and FIG. 9, except a plurality of mufflers are used on the exhaust of the truck to create as quiet a truck as possible for the actual drive-by and simulated situations. It can be seen that the stationary test is silenced to a lower sound level. Baseline curves of the type in FIGS. 10 and 11 and measured curved of the type in FIGS. 7 and 9 are used along with the equation discussed in the "Summary of the Invention" to determine the sound contribution of a particular muffler. Such usage results in the peculiar advantage therein described.

Thus, the advantages and details of the test apparatus and method of the present invention have been described. It is understood, however, that the present disclosure is representative of the concept. Consequently, changes made to the full extent extended by the general meaning of the terms in which the appended claims are expressed, are within the principle of the invention.

What is claimed is:

1. Apparatus for producing operating conditions and measuring sound of an operable vehicle during a stationary simulated drive-by test, said apparatus comprising:

an actual vehicle including wheels and means for driving said wheels, said driving means including an engine with means for exhausting gases, said exhausting means including a muffler, said driving means being disconnected with respect to driving said wheels;

a dynamometer;

means attached to said actual vehicle for connecting said dynamometer to said driving means;

means for controlling said dynamometer to simulate operational loading of said engine;

means for measuring sound, said measuring means including a plurality of regularly spaced microphones along a first line parallel to and spaced from a second line, said second line being an imaginary direction of travel of said actual vehicle; and means for at least partially shielding sound emanating from said driving means from said microphones, said muffler being unshielded by said shielding means with respect to said microphones;

whereby said shielding means shields much of the sound from said driving means, except from said muffler, so that said sound measuring means measures primarily muffler sound in the operational environment of said muffler even though said actual vehicle is not moving, said dynamometer and said controlling means simulating operational loading of said engine.

2. A method for simulating sound of a first vehicle during a drive-by and measuring the simulated sound, said method comprising the steps of:
- determining from operation of said first vehicle a desired acceleration rate to be simulated;
- disconnecting driving means from driving wheels of a second vehicle;
- connecting a dynamometer to said driving means, said connected dynamometer being mounted on said second vehicle;
- locating a microphone at a distance from said second vehicle where a sound level measurement is desired;
- at least partially shielding sound sources on said second vehicle other than said muffler from said microphone;
- running said disconnected driving means under load of said dynamometer to simulate with said second vehicle said determined acceleration rate; and
- measuring the sound level of said muffler as sensed at said microphone.

3. The method of claim 2 wherein said driving means running step includes controlling engine throttle of said driving means and load applied by said dynamometer to simulate said determined acceleration rate.

4. A method for simulating sound of a first vehicle during a drive-by and measuring the simulated sound, said method comprising the steps of:
- disconnecting driving means from driving wheels of a second vehicle;
- connecting a dynamometer to said driving means;
- locating a plurality of microphones along a line parallel to a centerline of said second vehicle when said second vehicle is aligned along an imaginary direction of travel;
- at least partially shielding sound sources on said second vehicle other than said muffler from said microphones;
- running said disconnected driving means under load of said dynamometer; and
- measuring simultaneously the sound level of said muffler at said microphones.

* * * * *